US010466968B1

(12) United States Patent
Elkin

(10) Patent No.: US 10,466,968 B1
(45) Date of Patent: Nov. 5, 2019

(54) RADIX-4 MULTIPLIER PARTIAL PRODUCT GENERATION WITH IMPROVED AREA AND POWER

(71) Applicant: NVIDIA Corp., Santa Clara, CA (US)

(72) Inventor: Ilyas Elkin, Sunnyvale, CA (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/033,468

(22) Filed: Jul. 12, 2018

(51) Int. Cl.
*G06F 7/523* (2006.01)
*G06F 7/49* (2006.01)

(52) U.S. Cl.
CPC ................ *G06F 7/523* (2013.01); *G06F 7/49* (2013.01); *G06F 2207/4812* (2013.01)

(58) Field of Classification Search
CPC ............. G06F 7/49; G06F 7/523–5338; G06F 2207/4812
See application file for complete search history.

(56) References Cited

U.S. PATENT DOCUMENTS 6,285,300 B1 * 9/2001 Colon-Bonet ........ G06F 7/5338 326/98
6,604,120 B1 * 8/2003 De Angel ............... G06F 7/503 708/628
2007/0203962 A1 * 8/2007 Hirairi .................. G06F 7/5332 708/7
2011/0264719 A1 * 10/2011 Mortensen ............ G06F 7/4824 708/204
2012/0144161 A1 * 6/2012 Elliott ................... G06F 7/5338 712/42
2013/0226982 A1 * 8/2013 Yu ......................... G06F 7/5338 708/523
2014/0358979 A1 * 12/2014 Singh ...................... G06F 7/506 708/209
2015/0235634 A1 * 8/2015 Liu ........................ G09G 5/395 345/547

OTHER PUBLICATIONS

P. S. Teja, “Design of Radix-8 Booth Multiplier Using Koggestone Adder for High Speed Arithmetic Applications,” Emerging Trends in Electrical, Electronics & Instrumentation Engineering: An international Journal (EEIEJ), vol. 1, No. 1, Feb. 2014 (Year: 2014).*
S. Samavi, “High Radix Multipliers,” Jan. 2014, retrieved from https://www.researchgate.net/publication/262836009 (Year: 2014).*

* cited by examiner

*Primary Examiner* — Matthew D Sandifer
(74) *Attorney, Agent, or Firm* — RowanTELS LLC

(57) ABSTRACT

A system including a series of partial product select encoders and partial product muxes, each of the partial product select encoders receiving a multiplier, receiving a carry input from a multiplier tree, and outputting a select signal to an associated partial product mux based on the multiplier and carry input, and each of the partial product muxes outputting a partial product based on the select signal and a multiplicand received.

16 Claims, 7 Drawing Sheets

500

| MSB PP ENCODER INPUTS 502 | | | | UNSIGNED PP ENCODER OUTPUTS 504 | | | SIGNED PP ENCODER OUTPUTS 506 | |
|---|---|---|---|---|---|---|---|---|
| B[M] | B[M-1] | Cin | | MSB PP (*A) | Cout PP (*4A) | | MSB PP (*A) | Cout PP (*4A) |
| 0 | 0 | 0 | | 0 | 0 | | 0 | 0 |
| 0 | 0 | 1 | | 1 | 0 | | 1 | 0 |
| 0 | 1 | 0 | | 1 | 0 | | 1 | 0 |
| 0 | 1 | 1 | | 2 | 0 | | 2 | 0 |
| 1 | 0 | 0 | | 2 | 0 | | 2 | -1 |
| 1 | 0 | 1 | | -1 | 1 | | -1 | 0 |
| 1 | 1 | 0 | | -1 | 1 | | -1 | 0 |
| 1 | 1 | 1 | | 0 | 1 | | 0 | 0 |

FIG. 5

RADIX-4 MULTIPLIER PARTIAL PRODUCT GENERATION WITH IMPROVED AREA AND POWER

BACKGROUND

Circuits such as programmable matrix-multiply-and-accumulate units commonly use multiplier circuits. The area and power consumption of multiplier circuits may benefit from reducing the number of partial products that are input to multiplier trees in these circuits.

One conventional way to reduce the number of partial products is to utilize a higher radix encoding, such as radix four (4). Consider a multiply operation A×B where A is the multiplicand and B is the multiplier. Some conventional designs utilize Booth encoding, which generates select signals from multiplier B to select a shift of multiplicand A by an AND-OR (AO) multiplexer (mux). This operation is followed by an exclusive OR (XOR) to negate the output of the AO mux. A drawback of this approach is that each partial product of the multiplication operation has an associated negating XOR, which is prone to power consuming glitches in some circumstances.

A so-called Booth Mux or Booth selector may be utilized in some solutions. A Booth Mux is effectively a 5-input multiplexer that selects an output from among 0, A, 2A, −A, and −2A for every two bits of operand B. This is inefficient for multipliers that utilize radix-4 encoding, in which a 4-input mux is sufficient.

Some conventional solutions do utilize 4-input muxes. One such solution utilizes a mux that selects its output from among 0, A, 2A, and 3A. These solutions utilize an extra adder to generate 3A by adding A and 2A. Another conventional solution utilizes a 4-input mux that selects its output from among 0, A, 2A, and −A. Those solutions utilize a carry chain between partial product select encoders, which introduces latency, especially for wide-input multipliers.

A need therefore exists for solutions utilizing 4-input muxes that do not incur the latency of conventional carry chains.

BRIEF SUMMARY

Embodiments of multipliers are disclosed that utilize 0, A, 2A, and −A encoding. A sparse parallel prefix tree is utilized to generate carry inputs for partial product encoders in as low as order of ($\log_2$(width/2)) delay, instead of order of (width/2) delay as with serial carry chains, to reduce carry propagation latency. Each partial product encoder takes two bits of the B operand and generates a propagate and generate output to a parallel prefix tree, such as those utilized in carry look ahead adders. A carry signal is generated by the parallel prefix tree and output back to the partial product encoder, where it is then used to generate selects for the partial product muxes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates an embodiment of an encoder input-output table 500.

DETAILED DESCRIPTION

A novel multiplier is disclosed that improves serial carry propagation delay by utilizing a parallel prefix adder carry tree. The multiplier improves over multipliers that utilize radix 4 Booth encoding by changing each partial product mux from a logical 5-input (0, A, 2A, −A, −2A) mux to a 4-input (0, A, 2A, −A) mux. This enables a simpler (and thus reduced die area, for example) and less glitchy multiplexer circuit of AO222 gate, or a single stage OAI222 gate with inputs and selects inverted, instead of AO22+XOR2 or AOI22+XNR2 in radix-4 Booth encoding. The circuit thus glitches less than conventional multipliers that utilize XOR for inversion of partial products. Herein, "glitch" refers to circuit switching and/or a corresponding increase in power consumption.

Additionally, in pipelined applications, such as when selects are generated in-cycle before the multiplier tree, only two selects are flopped, instead of three, for every two bits of B. In other words, the multiplier partial product encoder operates using a sliding window of two B bits, instead of three B bits. The multiplier thus allows for simpler gates to be used as partial product muxes, which are a large part of multiplier area, and also utilizes fewer flops (lower area and clock power) driving the select inputs of the partial product muxes. For a wide range of multiplier sizes, the multiplier area savings may be on order of 10% over multipliers that implement Booth encoding. Additionally, the negation XOR2 in radix 4 Booth has about 50% chance of inverting the individual partial product, whereas the disclosed implementations only require a single inverted −A input that is shared among all partial product muxes, and used in calculations with only about 25% probability for random inputs. This has a benefit of reduced logical glitching from inversions to generate negative partial products, and saves power.

Figure 1:
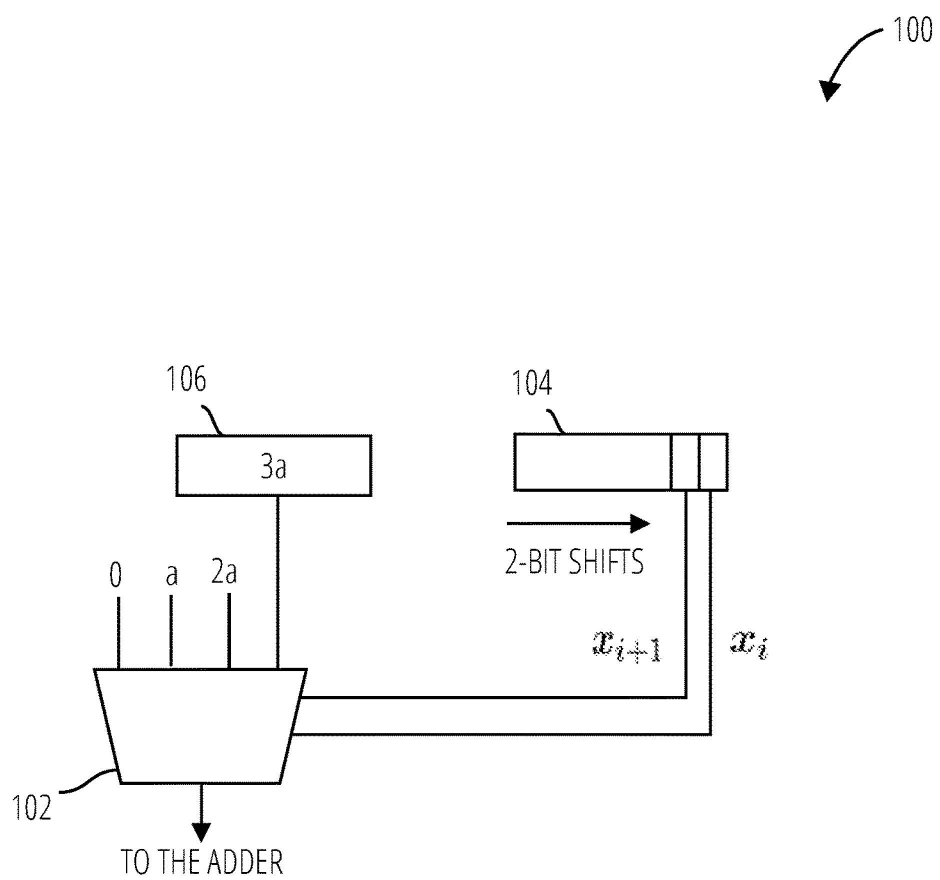
FIG. 1 illustrates an embodiment of a conventional encoder 100.

Referring to FIG. 1, a conventional serial implementation of partial product encoder 100 comprises a mux 102, a 2 bit shift register 104 (the B operand), and an adder 106. The conventional encoder 100 implements a mux 102, which selects from [0, A, 2A, 3A], for example using an OAI222 circuit structure as the select input of the mux 102. The mux 102 may be implemented using a 12 transistor OR-AND-INVERT circuit in which the bits of the B operand (multiplier 104) are distributed in two-bit windows to three two-input OR gates that in turn drive a NAND gate. The conventional encoder 100 utilizes a 3A adder 106 and may require 3A flops for latency critical pipelined implementation, similar to a radix 8 Booth encoder, but only achieves radix-4 partial product reduction. The adder 106 adds A and 2A to generate 3A.

Figure 2:
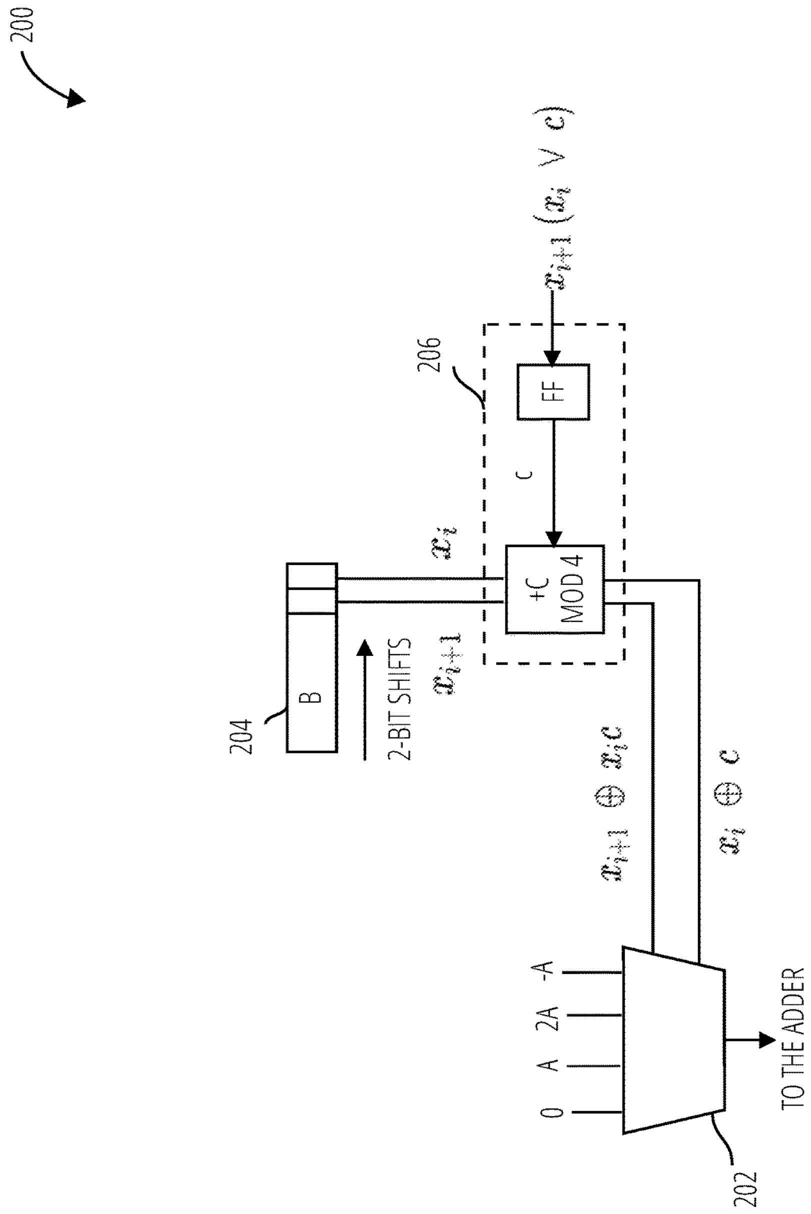
FIG. 2 illustrates an embodiment of a partial product encoder 200.

Referring to FIG. 2, another conventional serial implementation of a partial product encoder 200 comprises a mux 202, a 2 bit shift register 204 (the B operand), and a partial product encoder 206. The mux 202 selects from [0, A, 2A, −A], where 3A is re-encoded as (−A+4A), with 4A implemented as a carry to a subsequent partial product (PP) encoding performed by the partial product encoder 206, via a carry chain through a flip flop (FF) in the partial product encoder 206. The partial product encoder 200 does not include a 3A adder, only an invert to generate −A, which is shared across all partial products. The mux 202 may be implemented using 12 transistors and the partial products invert with probability of 1/4 instead of 1/2 probability for Booth encoding, improving glitching and reducing power. The partial product encoder 200 thus implements a "1-hot" decoding in which only two B bits from the shift register 204 are flopped. This is achieved at the expense of a carry chain propagating through all partial products via an additional flip flop for every two bits of B.

Figure 3:
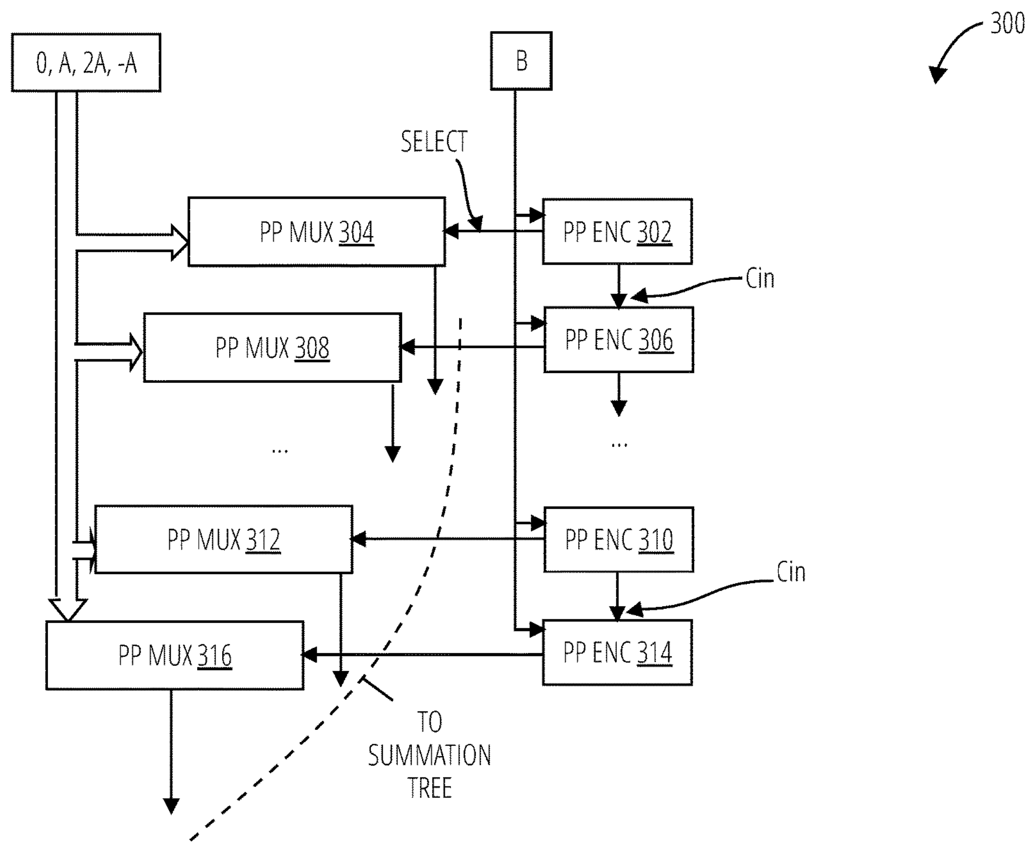
FIG. 3 illustrates an embodiment of a partial product encoding system 300.

Referring to FIG. 3, the multi-cycle loop of partial product encoder 200 is unrolled into a parallel multiplier working on all bits of B simultaneously using a partial product encoding system 300 that includes a stack of PP encoders (partial product encoder 302, partial product encoder 306, partial product encoder 310, and partial product encoder 314) and corresponding partial product multiplexers (partial product mux 304, partial product mux 308, partial product mux 312, and partial product mux 316). For each partial product encoder, $C_{out}$=B[i+1] & (B[i]|$C_{in}$). In this system a carry propagates through a number N=width(B)/2 chain of encoders in one cycle. For multipliers implemented using the partial product encoding system 300, this carry chain creates a latency problem in critical datapaths in which partial product selects are generated on the B input which has a late arrival and needs to propagate through the carry chain to generate selects which are flopped to be used for partial product muxes in the following cycle.

Figure 4:
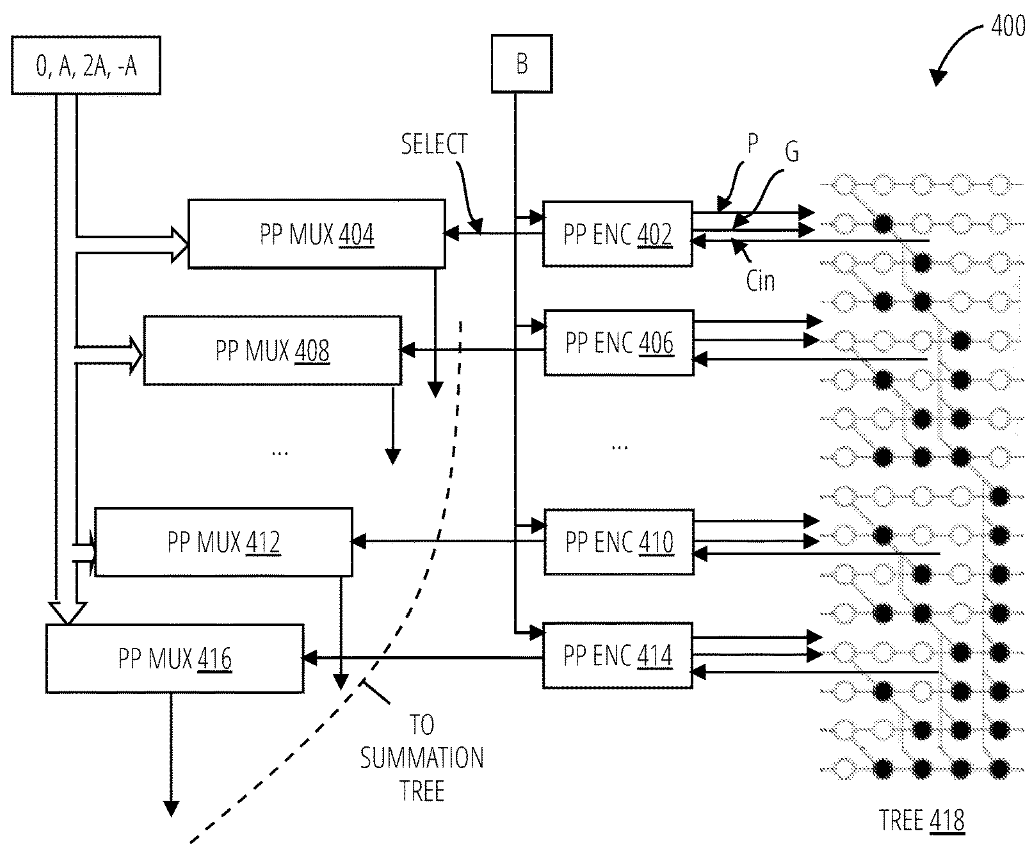
FIG. 4 illustrates an embodiment of a partial product encoding system 400.

Referring to FIG. 4, an improved partial product encoding system 400 comprises a partial product encoder 402, a partial product mux 404, a partial product encoder 406, a partial product mux 408, a partial product encoder 410, a partial product mux 412, a partial product encoder 414, a partial product mux 416, and a parallel prefix adder tree 418. Each partial product mux may be implemented as AO222 (or OAI222 with inputs inverted) which selects from [0, A, 2A, and −A]. The encoders and muxes form a series, as depicted. For each partial product encoder, a generate output G and a propagate output P are generated, where G=B[i+1] & B[i] and P=B[i+1]. Note the difference here from how G and P are formed in conventional parallel prefix adders, in which G=AiBi and P=Ai XOR Bi. Here, G corresponds to the case of B[i+1:i]=3, which generates a carry to the next set, and P corresponds to the case of B[i+1:i]=2, which propagates a carry from the previous set to the next set.

The outputs G and P are applied to the parallel prefix adder tree 418. The parallel prefix adder tree 418 (e.g., a Sklansky tree, Brent Kung tree, Ladner Fisher tree etc.) is utilized to generate $C_{in}$ carry bits from G and P In a conventional adder, these $C_{in}$ carry bits would be XORed with corresponding bits of adder inputs to generate the sum output, whereas in the partial product encoding system 400 they are fed back to the partial product encoders, which generate two bit encoded selects S[i+1:i] for the partial product mux, by adding $C_{in}$ to B[i+1:i]. The encoded selects S[i+1:i] may then be decoded to one hot selects, where S[i+1:i]=1 enables one hot select corresponding to partial product mux input A, S[i+1:i]=2, enables one hot select for 2A, S[i+1:0]=3 enables one hot select for inverted input −A, and S[i+1:i]=0 disables all one hot inputs to the partial product mux, thus selecting 0. The $C_{in}$ carry bits are calculated and applied to the partial product encoders in parallel, thus incurring only ~$\log_2$(width(B)/2) delay of the parallel prefix tree. The partial product encoding system 400 is faster and more efficient than solutions that require use of an adder to generate 3A, the tree input is half the width of the multiplier B (e.g., sparse), and in pipelined latency critical implementations, there are no extra flops over the number required for radix-2 encoding.

The partial product encoders comprise logic to process the most significant bit (MSB) of the B multiplier, depending on whether B is signed or unsigned. Referring to FIG. 5, an encoder input-output table 500 shows most significant bit (MSB) partial-product (PP) encoder inputs 502 from the B multiplier, unsigned encoder outputs 504, and signed encoder outputs 506 for the partial product encoding system 400.

Figure 6:
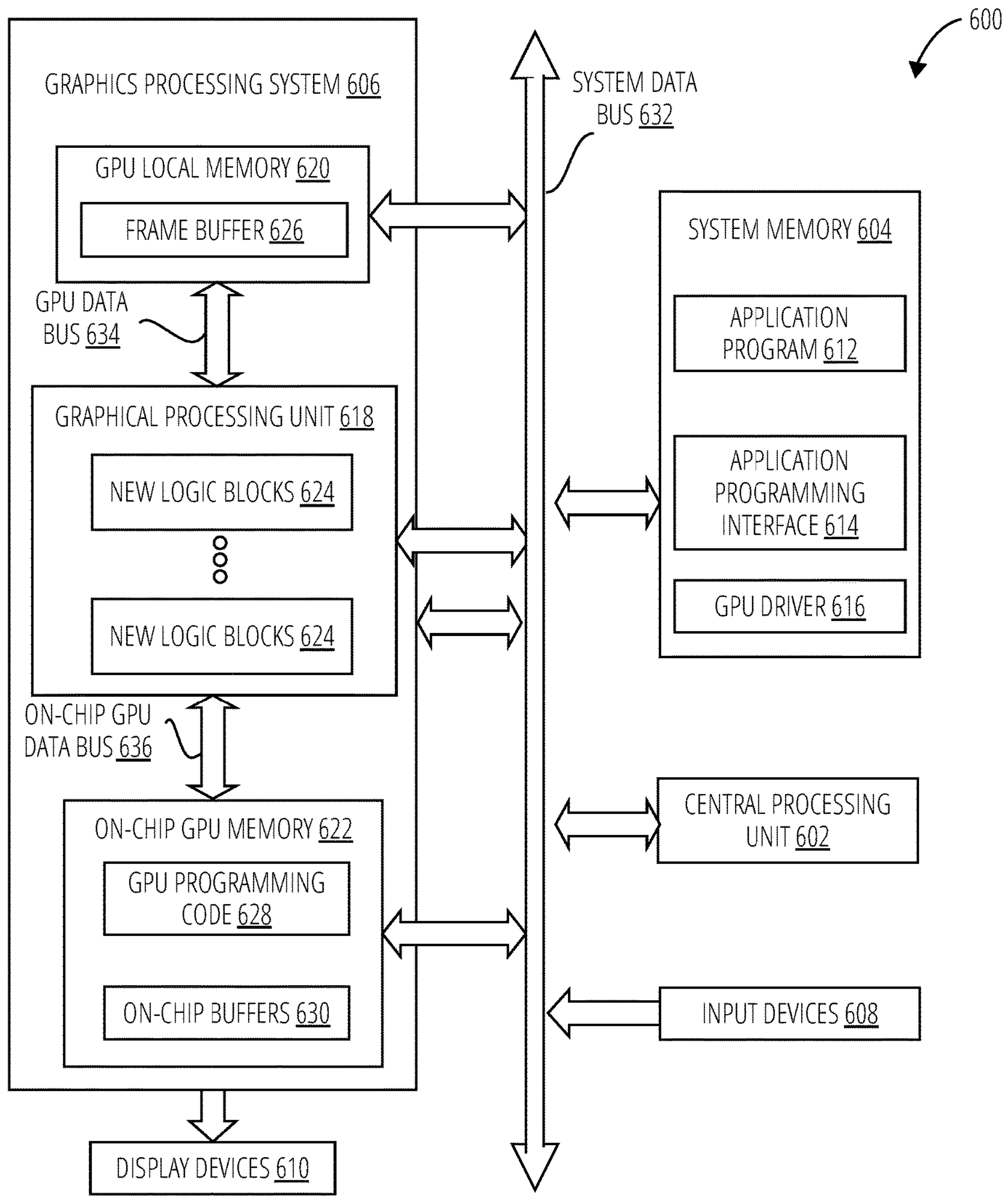
FIG. 6 is a block diagram of a computing system 600 within which the embodiments described herein may be utilized.

FIG. 6 is a block diagram of one embodiment of a computing system 600 in which one or more aspects of the invention may be implemented. The computing system 600 includes a system data bus 632, a CPU 602, input devices 608, a system memory 604, a graphics processing system 606, and display devices 610. In alternate embodiments, the CPU 602, portions of the graphics processing system 606, the system data bus 632, or any combination thereof, may be integrated into a single processing unit. Further, the functionality of the graphics processing system 606 may be included in a chipset or in some other type of special purpose processing unit or co-processor.

As shown, the system data bus 632 connects the CPU 602, the input devices 608, the system memory 604, and the graphics processing system 606. In alternate embodiments, the system memory 604 may connect directly to the CPU 602. The CPU 602 receives user input from the input devices 608, executes programming instructions stored in the system memory 604, operates on data stored in the system memory 604, and configures the graphics processing system 606 to perform specific tasks in the graphics pipeline. The system memory 604 typically includes dynamic random access memory (DRAM) employed to store programming instructions and data for processing by the CPU 602 and the graphics processing system 606. The graphics processing system 606 receives instructions transmitted by the CPU 602 and processes the instructions to render and display graphics images on the display devices 610.

As also shown, the system memory 604 includes an application program 612, an API 614 (application programming interface), and a graphics processing unit driver 616 (GPU driver). The application program 612 generates calls to the API 614 to produce a desired set of results, typically in the form of a sequence of graphics images. The application program 612 also transmits zero or more high-level shading programs to the API 614 for processing within the graphics processing unit driver 616. The high-level shading programs are typically source code text of high-level programming instructions that are designed to operate on one or more shading engines within the graphics processing system 606. The API 614 functionality is typically implemented within the graphics processing unit driver 616. The graphics processing unit driver 616 is configured to translate the high-level shading programs into machine code shading programs that are typically optimized for a specific type of shading engine (e.g., vertex, geometry, or fragment).

The graphics processing system 606 includes a GPU 618 (graphics processing unit), an on-chip GPU memory 622, an on-chip GPU data bus 636, a GPU local memory 620, and a GPU data bus 634. The GPU 618 is configured to communicate with the on-chip GPU memory 622 via the on-chip GPU data bus 636 and with the GPU local memory 620 via the GPU data bus 634. The GPU 618 may receive instructions transmitted by the CPU 602, process the instructions to render graphics data and images, and store these images in the GPU local memory 620. Subsequently, the GPU 618 may display certain graphics images stored in the GPU local memory 620 on the display devices 610.

The GPU 618 includes one or more new logic blocks 624. The operation of the new logic blocks 624 is described more fully in conjunction with FIG. 6 (deleted).

The GPU 618 may be provided with any amount of on-chip GPU memory 622 and GPU local memory 620, including none, and may employ on-chip GPU memory 622, GPU local memory 620, and system memory 604 in any combination for memory operations.

The on-chip GPU memory 622 is configured to include GPU programming 628 and on-Chip Buffers 630. The GPU programming 628 may be transmitted from the graphics processing unit driver 616 to the on-chip GPU memory 622 via the system data bus 632. The GPU programming 628 may include a machine code vertex shading program, a machine code geometry shading program, a machine code fragment shading program, or any number of variations of each. The on-Chip Buffers 630 are typically employed to store shading data that requires fast access to reduce the latency of the shading engines in the graphics pipeline. Because the on-chip GPU memory 622 takes up valuable die area, it is relatively expensive.

The GPU local memory 620 typically includes less expensive off-chip dynamic random access memory (DRAM) and is also employed to store data and programming employed by the GPU 618. As shown, the GPU local memory 620 includes a frame buffer 626. The frame buffer 626 stores data for at least one two-dimensional surface that may be employed to drive the display devices 610. Furthermore, the frame buffer 626 may include more than one two-dimensional surface so that the GPU 618 can render to one two-dimensional surface while a second two-dimensional surface is employed to drive the display devices 610.

The display devices 610 are one or more output devices capable of emitting a visual image corresponding to an input data signal. For example, a display device may be built using a cathode ray tube (CRT) monitor, a liquid crystal display, or any other suitable display system. The input data signals to the display devices 610 are typically generated by scanning out the contents of one or more frames of image data that is stored in the frame buffer 626.

Figure 7:
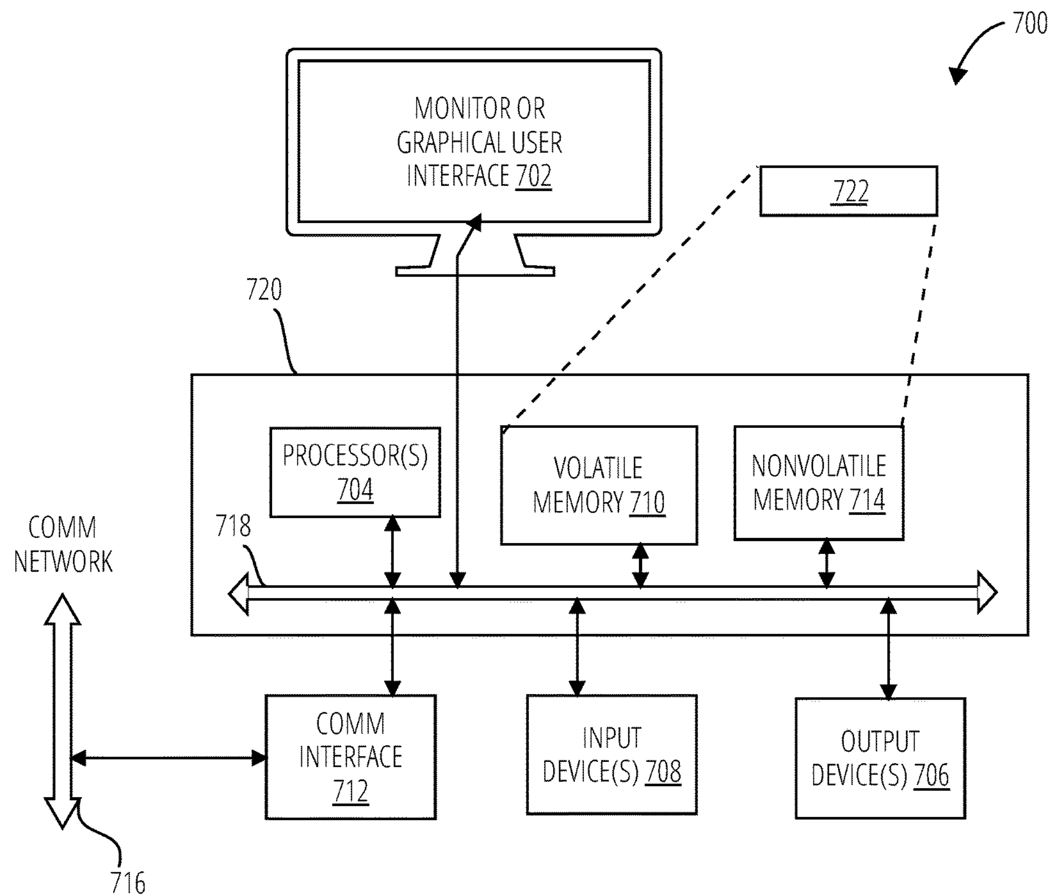
FIG. 7 is an example block diagram of a computing device 700 that may incorporate the embodiments described herein.

FIG. 7 is an example block diagram of a computing device 700 that may incorporate embodiments of the present invention. FIG. 7 is merely illustrative of a machine system to carry out aspects of the technical processes described herein, and does not limit the scope of the claims. One of ordinary skill in the art would recognize other variations, modifications, and alternatives. In one embodiment, the computing device 700 typically includes a monitor or graphical user interface 702, a data processing system 720, a communication network interface 712, input device(s) 708, output device(s) 706, and the like.

As depicted in FIG. 7, the data processing system 720 may include one or more processor(s) 704 that communicate with a number of peripheral devices via a bus subsystem 718. These peripheral devices may include input device(s) 708, output device(s) 706, communication network interface 712, and a storage subsystem, such as a volatile memory 710 and a nonvolatile memory 714.

The volatile memory 710 and/or the nonvolatile memory 714 may store computer-executable instructions and thus forming logic 722 that when applied to and executed by the processor(s) 704 implement embodiments of the processes disclosed herein.

The input device(s) 708 include devices and mechanisms for inputting information to the data processing system 720. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 706 include devices and mechanisms for outputting information from the data processing system 720. These may include the monitor or graphical user interface 702, speakers, printers, infrared LEDs, and so on as well understood in the art.

The communication network interface 712 provides an interface to communication networks (e.g., communication network 716) and devices external to the data processing system 720. The communication network interface 712 may serve as an interface for receiving data from and transmitting data to other systems. Embodiments of the communication network interface 712 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like.

The communication network interface 712 may be coupled to the communication network 716 via an antenna, a cable, or the like. In some embodiments, the communication network interface 712 may be physically integrated on a circuit board of the data processing system 720, or in some cases may be implemented in software or firmware, such as "soft modems", or the like.

The computing device 700 may include logic that enables communications over a network using protocols such as HTTP, TCP/IP, RTP/RTSP, IPX, UDP and the like.

The volatile memory 710 and the nonvolatile memory 714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 710 and the nonvolatile memory 714 may be configured to store the basic programming and data constructs that provide the functionality of the disclosed processes and other embodiments thereof that fall within the scope of the present invention.

Logic 722 that implements embodiments of the present invention may be stored in the volatile memory 710 and/or the nonvolatile memory 714. Said logic 722 may be read from the volatile memory 710 and/or nonvolatile memory 714 and executed by the processor(s) 704. The volatile memory 710 and the nonvolatile memory 714 may also provide a repository for storing data used by the logic 722.

The volatile memory 710 and the nonvolatile memory 714 may include a number of memories including a main random access memory (RAM) for storage of instructions and data during program execution and a read only memory (ROM) in which read-only non-transitory instructions are stored. The volatile memory 710 and the nonvolatile memory 714 may include a file storage subsystem providing persistent (non-volatile) storage for program and data files. The volatile memory 710 and the nonvolatile memory 714 may include removable storage systems, such as removable flash memory.

The bus subsystem 718 provides a mechanism for enabling the various components and subsystems of data processing system 720 communicate with each other as intended. Although the communication network interface 712 is depicted schematically as a single bus, some embodiments of the bus subsystem 718 may utilize multiple distinct busses.

It will be readily apparent to one of ordinary skill in the art that the computing device 700 may be a device such as a smartphone, a desktop computer, a laptop computer, a rack-mounted computer system, a computer server, or a tablet computer device. As commonly known in the art, the computing device 700 may be implemented as a collection of multiple networked computing devices. Further, the computing device 700 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A multiplier circuit comprising:

a plurality of multiplexers;

each of the multiplexers receiving a select input from a corresponding encoder and selecting a partial product in response;

each encoder receiving a carry input from a carry tree and generating the corresponding select input based at least on the carry input; and each encoder generating a propagate output P and a generate output G to the carry tree, wherein G=B[i+l] & B[i] and P=B[i+1], and B is a multiplier input to the multiplier circuit, and B[i] is the ith bit of B.

2. The multiplier circuit of claim 1, wherein each of the plurality of multiplexers comprises four inputs consisting of 0, A, 2A, and −A, A being a multiplicand input to the multiplier circuit.

3. The multiplier circuit of claim 1, wherein the each of the multiplexers is an AO222 with one/zero hot encoded selects.

4. The multiplier circuit of claim 1, wherein the carry tree is a Sklansky tree.

5. The multiplier circuit of claim 1, wherein the carry tree is a parallel prefix network.

6. The multiplier circuit of claim 5 wherein the carry tree is a sparse parallel prefix network.

7. The multiplier circuit of claim 1, wherein the each of the multiplexers is an OAI222 with inputs and one/zero hot selects inverted.

8. A multiplier circuit comprising:

a plurality of partial product encoders, each receiving a carry input from a sparse parallel prefix tree;

each partial product encoder generating a propagate output P and a generate output G to the sparse parallel prefix tree, wherein G and P are computed from exactly two consecutive bits of a multiplier input B; and each partial product encoder outputting a one-hot select signal based at least on the carry input to a corresponding partial product selection circuit, wherein each partial product selection circuit outputs a partial product in response to receiving said one-hot select signal.

9. The multiplier circuit of claim 8, wherein the sparse parallel prefix tree is a Sklansky tree.

10. The multiplier circuit of claim 8, wherein each partial product selection circuit selects one of 0, A, 2A, and −A, A being a multiplicand input to the multiplier circuit.

11. The multiplier circuit of claim 8, wherein G=B[i+1] & B[i] and P=B[i+1].

12. The multiplier circuit of claim 8, wherein the each of the partial product selection circuits is an AO222 multiplexer.

13. The multiplier circuit of claim 8, wherein the each of the partial product selection circuits is an OAI222 multiplexer.

14. A multiplier circuit comprising:

a plurality of partial product selection circuits each paired with a corresponding partial product encoder; and a parallel prefix tree;

where generate and propagate outputs G and P of each partial product encoder are applied to the parallel prefix tree to generate Cin carry bits that are fed back to the corresponding partial product encoder, which generate two bit encoded selects S[i+1:i] for the corresponding partial product selection circuits by adding Cin to two bits of a multiplier input B, and where each partial product selection circuit outputs a partial product in response to receiving the corresponding two bit encoded select.

15. The multiplier circuit of claim 14, wherein the encoded selects S[i+1:i] are decoded to one-hot selects, where S[i+1:i]=1 enables one hot select corresponding to partial product A, S[i+1:i]=2, enables one hot select for partial product 2A, S[i+1:0]=3 enables one hot select for partial product −A, and S[i+1:i]=0 disables one hot inputs to the partial product selection circuit.

16. The multiplier circuit of claim 14, wherein the parallel prefix tree is a Sklansky tree.

* * * * *